United States Patent
Berchanskiy et al.

(10) Patent No.: US 11,157,068 B2
(45) Date of Patent: Oct. 26, 2021

(54) POWER STATE MANAGEMENT FOR LANES OF A COMMUNICATION PORT

(71) Applicant: Intel Corporation, Santa Clara, CA (US)

(72) Inventors: Dmitriy Berchanskiy, Roseville, CA (US); Vinay Raghav, Folsom, CA (US); Udaya Natarajan, El Dorado Hills, CA (US); Huimin Chen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 16/258,355

(22) Filed: Jan. 25, 2019

(65) Prior Publication Data

US 2019/0155361 A1 May 23, 2019

(51) Int. Cl.
*G06F 1/3234* (2019.01)
*G06F 1/329* (2019.01)
*G06F 1/26* (2006.01)
*G06F 1/3228* (2019.01)
*G06F 1/3287* (2019.01)

(52) U.S. Cl.
CPC .............. *G06F 1/329* (2013.01); *G06F 1/266* (2013.01); *G06F 1/3228* (2013.01); *G06F 1/3253* (2013.01); *G06F 1/3287* (2013.01)

(58) Field of Classification Search
CPC ...... G06F 1/266; G06F 1/3228; G06F 1/3253; G06F 1/3287; G06F 1/329; Y02D 10/00
See application file for complete search history.

(56) References Cited

U.S. PATENT DOCUMENTS

| 7,136,953 B1* | 11/2006 | Bisson | G06F 13/4018 710/307 |
| 7,188,263 B1* | 3/2007 | Rubinstein | G06F 1/3209 713/300 |
| 7,447,824 B2* | 11/2008 | Jabori | G06F 1/3253 710/307 |
| 7,984,314 B2* | 7/2011 | Cooper | G06F 1/3206 713/323 |
| 10,069,711 B2* | 9/2018 | Rotithor | H04L 41/0896 |
| 2007/0050653 A1* | 3/2007 | Verdun | G06F 1/3253 713/320 |
| 2007/0150762 A1* | 6/2007 | Sharma | G06F 1/3203 713/300 |
| 2011/0231685 A1* | 9/2011 | Huang | G06F 1/325 713/321 |

(Continued)

*Primary Examiner* — Jaweed A Abbaszadeh
*Assistant Examiner* — Brian J Corcoran
(74) *Attorney, Agent, or Firm* — Schwabe, Williamson & Wyatt, P.C.

(57) ABSTRACT

Embodiments may include systems and methods for communication including a communication port with a first lane and a second lane, a first power controller and a second power controller coupled to the communication port. The first power controller is to control, at a first time instance, the first lane to operate in a first power state selected from a first set of power states for the first lane. The second power controller is to control, at a second time instance, the second lane to operate in a second power state selected from a second set of power states for the second lane, wherein the first power state is different from the second power state. Other embodiments may be described and/or claimed.

16 Claims, 7 Drawing Sheets

(56) References Cited

U.S. PATENT DOCUMENTS

2014/0208138 A1* 7/2014 Homchaudhuri ..... H04W 52/00
 713/320
2019/0250930 A1* 8/2019 Erez ..................... G06F 1/3281

* cited by examiner

US 11,157,068 B2

POWER STATE MANAGEMENT FOR LANES OF A COMMUNICATION PORT

FIELD

Embodiments herein relate generally to the technical fields of power management, communication, and computing, and more particularly to power state management for lanes of a communication port.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer bus, a communication link, or an input/output (I/O) interconnect, may be a part of a communication system that facilitates transfer of data between devices or components inside or between computing or communication devices. A computing or communication system may include multiple computing or communication devices or components, coupled together by a computer bus, a communication link, or an I/O interconnect. A device or component may be coupled to a computing bus through an interface circuitry, e.g., a communication port. A computer bus, in addition to the hardware components (wire, optical fiber, etc.), may have associated software, communication protocols, and so forth. A communication protocol may be a set of rules that allow two devices to communicate information on a computer bus, a communication link, or an I/O interconnect between them. There may be many kinds of computer bus, such as serial buses or parallel buses. Various current computer buses may have increased bandwidths compared to previous computer buses. However, increased bandwidths for computer buses may also increase power consumptions for the computer buses.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
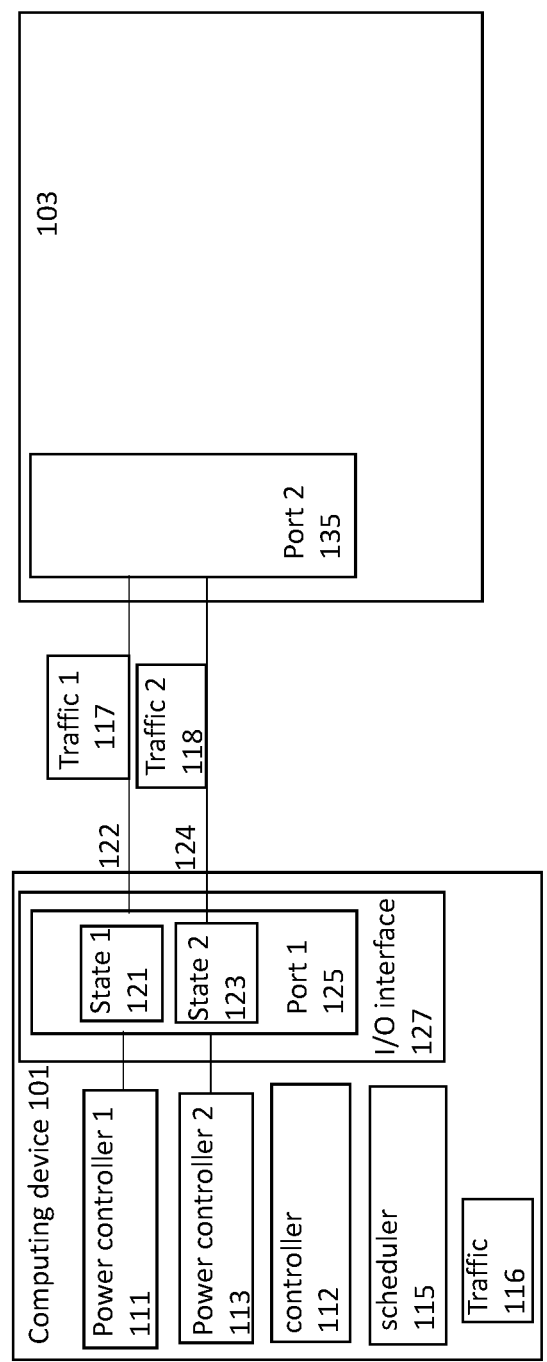
FIG. 1 illustrates an example computing device including the present disclosure having a first power controller to control a first lane of a communication port, and a second power controller to control a second lane of the communication port, in accordance with various embodiments.

As described earlier, a computer bus, a communication link, or an input/output (I/O) interconnect, may be a part of a communication system that facilitates transfer of data between devices or components. A communication port is an endpoint of the bus, the communication link, or the I/O interconnect. An external device to a computer device may be coupled to a computer bus, a communication link, or an I/O interconnect of the computer device through a communication port or an interface circuitry. Operations of the computer bus, the communication link, or the I/O interconnect, may be based on various standards or communication protocols, e.g., a universal serial bus (USB) protocol for the USB bus, a peripheral component interconnect (PCI) protocol or peripheral component interconnect express (PCIe) for the PCI bus, and so forth. In addition, protocols may be updated from time to time with increased bandwidths. Accordingly, increased bandwidths for computer buses may also increase power consumptions for the computer buses.

To manage the power consumptions for a computer bus, some existing techniques, e.g., PCI power management techniques such as active state power management (ASPM), may manage power states of the entire PCI bus. However, such techniques may not be sufficient to improve the power consumption of the computing devices coupled by a computer bus. In reality, for example, when devices such as network devices, audio devices, or video devices are connected by a PCIe bus on a client platform, some of the devices may end up just using minimal bandwidth at certain time instances. Sometimes, the traffic transmitted over the PCIe bus may not be bursty or may be predominantly unidirectional. Current power management techniques have failed to take advantage of such traffic load characteristic at various time instances for the communication port or lanes within the communication port.

Embodiments herein may introduce power management techniques based on a power state of each individual lane of a communication port, which selectively throttle power of individual lanes. For example, more power may be allocated only to those lanes for the operations on those lanes at a particular time instance, while placing the remaining lanes in low power states. Hence, embodiments herein may present dynamic power management techniques that adjust a power state of a lane of a communication port according to a traffic load characteristic at various time instances for the lane. Furthermore, techniques presented herein may be compatible with existing power management techniques such as ASPM. Even though embodiments herein may use PCIe or PCI as examples to explain the techniques, the techniques can be equally applied to other multi-lane interconnects such as Thunderbolt®, USB, processor to processor interconnect, e.g., QuickPath Interconnect® (QPI).

In embodiments, an apparatus for communication includes a communication port including a first lane and a second lane, a first power controller and a second power controller coupled to the communication port. The first power controller is to control, at a first time instance, the first lane to operate in a first power state selected from a first set of power states for the first lane. The second power controller is to control, at a second time instance, the second lane to operate in a second power state selected from a second set of power states for the second lane, wherein the first power state is different from the second power state.

In embodiments, one or more non-transitory computer-readable media includes instructions to be executed by a controller. In response to execution of the instructions by the controller, the controller is to control a first lane of a communication port, at a first time instance, to operate in a first power state selected from a first set of power states for the first lane. The controller is to also control a second lane of the communication port, at a second time instance, to operate in a second power state selected from a second set of power states for the second lane, wherein the first power state is different from the second power state.

In embodiments, an apparatus for computing includes a printed circuit board (PCB) having a processor. A communication port including a first lane and a second lane is disposed on the PCB. The communication port is a part of a input/output (I/O) interface that is compliant with a PCI protocol. A controller is disposed on the PCB and coupled to the first lane and the second lane. The controller is to control the first lane of the communication port, at a first time instance, to operate in a first power state selected from a first set of power states for the first lane; and control the second lane of the communication port, at a second time instance, to operate in a second power state selected from a second set of power states for the second lane, where the first power state is different from the second power state.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrases "A/B," "A or B," and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments, a module may be a distinct circuit, while in other embodiments a module may include a plurality of circuits.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" or "interface" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or eNB, gNB, base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "physical channel," "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example computing device 101 including the present disclosure having a first power controller 111 to control a first lane 122 of a communication port 125, and a second power controller 113 to control a second lane 124 of the communication port 125, in accordance with various embodiments. For clarity, features of the computing device 101, the first power controller 111, the first lane 122, the second power controller 113, the second lane 124, and the communication port 125 are described below as an example of a computing device including the present disclosure having a first power controller to control a first lane of a communication port, and a second power controller to control a second lane of the communication port. It is to be understood that there may be more or fewer components included in the computing device 101, the first power controller 111, the first lane 122, the second power controller 113, the second lane 124, and the communication port 125. Further, it is to be understood that one or more of the devices and components within the computing device 101, the first power controller 111, the first lane 122, the second power controller 113, the second lane 124, and the communication port 125 may include additional and/or varying features from the description below, and may include any device that one having ordinary skill in the art would consider and/or refer to as a computing device having a first power controller to control a first lane of a communication port, and a second power controller to control a second lane of the communication port.

In embodiments, the computing device 101 includes the first power controller 111, the second power controller 113, and the communication port 125 that is a part of an interface 127. The communication port 125 includes the first lane 122 and the second lane 124. In addition, the computing device 101 may optionally include a controller 112, a scheduler 115 to schedule a traffic load 116. The computing device 101 may be coupled to a computing device 103, where the port 125 of the computing device 101 is coupled to a port 135 of the computing device 103. The computing device 101 may be coupled to the computing device 103 in a peer to peer or master-slave mode.

In embodiments, the first power controller 111 is coupled to the communication port 125 to control, at a first time instance, the first lane 122 to operate in a first power state 121. The second power controller 113 is coupled to the communication port 125 to control, at a second time instance, the second lane 124 to operate in a second power state 123. The first power controller 111 or the second controller 113 may control the power delivery or consumption of the first lane 122 or the second lane 124, respectively. The first power controller 111 or the second controller 113 may also control operations of the first lane 122 or the second lane 124 that lead to change of power consumptions for the first lane 122 or the second lane 124. In addition, at the first time instance, the first lane 122 is to operate in the first power state 121 to receive or to transmit a traffic load 117. At the second time instance, the second lane 122 is to operate in the second power state 123 to receive or to transmit a traffic load 118. In some embodiments, the first power state 121 is different from the second power state 123. The first power state 121 is selected from a first set of power states for the first lane 122, while the second power state 123 is selected from a second set of power states for the second lane 124. More details of a set of power states for a lane of a communication port may be illustrated in FIGS. 2(a)-2(b) as examples. In some embodiments, the first power controller 111 and the second power controller 113 may be implemented by software executed on the controller 112, where the controller 112 is coupled to the communication port 125.

In some embodiments, the first set of power states for the first lane 122 is the same as the second set of power states for the second lane 124. In some other embodiments, the first set of power states for the first lane 122 may be different the second set of power states for the second lane 124. Furthermore, the first time instance may be the same as the second time instance. Hence, at a same time instance, the first lane 122 is to operate in the first power state 121, and the second lane 124 is to operate in the second power state 123, which may be different from the first power state 121.

In embodiments, the first power controller 111 or the second power controller 113 may control the power state 121 or the power state 123, respectively, based on characteristics of the traffic loads. For example, the first power controller 111 controls the first lane 122 to operate in the first power state 121 based on a characteristic of the traffic load 117 at the first time instance for the communication port 125 or for the first lane 122. The characteristic of the traffic load 117 at the first time instance may be predominantly unidirectional at the first lane 122 or under a full capacity supported by the communication port 125. Similarly, the second power controller 113 controls the second lane 124 to operate in the second power state 123 based on a characteristic of the traffic load 118 at the second time instance for the communication port 125 or for the second lane 124.

As a consequence, bandwidth at the communication port 125, the first lane 122, and the second lane 124, and power consumptions at the first lane 122 and the second lane 124 may correlate with each other. Different traffic types may utilize different bandwidth. For example, one traffic load may be based on the burst packets of data where the transmitter side accumulates a buffer of packets and sends it in a single burst (audio, for example), while another traffic load may be a steady stream of isochronous packets like video. In either case, the first power controller 111 or the second power controller 113 may adjust the power state of the first lane 122 and the power state of the second lane 124. Lesser the bandwidth that a lane of a communication port may transmit or receive, less power the lane may consume. In embodiments, data flows on lanes of a PCIe port or a USB port may be predominant in one direction as the case in a file transfer or data acquisition. As a result, power could be preserved on the lanes in opposite direction even the most intense traffic load may be transmitting in the one direction. In addition, when a device does not fully utilize the bandwidth and transfers data in only a number of lanes of a communication port in one direction, power consumption could be reduced on the remaining lanes of the communication port in the direction and automatically restored when more bandwidth is required.

In embodiments, the first power controller 111 or the second power controller 113 may adjust the power state 121 or the power state 123, respectively, from a time instance to another. A time instance may be defined or measured by any time mechanism implemented in the device 101. For example, a time instance may last about 1 nanosecond, 1 microsecond, 1 second, multiple second, or other time period deemed to be a time instance. Accordingly, the first power controller 111 may control the first lane 122 to operate in the first power state 121 based on a characteristic of the traffic load 117 at the first time instance for the communication port 125 or for the first lane 122, and may further control the first lane 122 to operate in a third power state based on a characteristic of the traffic load 117 for a third time instance different from the first time instance.

In embodiments, the scheduler 115 is coupled to the communication port 125, the first power controller 111, and the second power controller 113 to schedule a total traffic load 116, into the first traffic load 117 to the first lane 122 at the first time instance and the second traffic load 118 to the second lane 124 at the second time instance. The first traffic load 117 may have a characteristic different from the second traffic load 118. The first power controller 111 is to control the first lane 122 to operate in the first power state 121 at the first time instance based on the characteristic of the first traffic load 117, while the second power controller 113 is to control the second lane 124 to operate in the second power state 123 at the second time instance based on a characteristic of the second traffic load 118. In some embodiments, the scheduler 115 is to schedule the first traffic load 117 to be empty to switch off the first lane 122, and the first power state 121 for the first lane 122 is a power off state, when the total traffic load is below a threshold capacity.

In embodiments, the device 101 may operate in a host mode or a device mode. The communication port 125 is a downstream facing port (DFP), a upstream facing port (UFP), or a dual-role-data (DRD) port. The communication port 125 may be a part of the interface 127 for a bi-directional communication protocol, or a half-duplex communication protocol. For example, the communication port 125 may be a part of the interface 127 that is compliant with a protocol selected from universal serial bus (USB) 3.x, USB 2.0, USB 1.1, a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit ($I^2C$) protocol, a parallel advanced technology attachment (PATA) protocol, a serial ATA (SATA) protocol, an IEEE 1394 interface (FireWire) protocol, an inter-integrated circuit ($I^2C$) protocol, a small computer system interface (SCSI) protocol, or other computer bus protocols.

In embodiments, except for the teachings of the present disclosure incorporated, the computing device 101 may otherwise be any computing system, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the computing device 101 may also be a non-mobile device that may include, but is not to be limited to, for example, a personal computer (PC), a television, a smart television, a data communication device, a media playing device, a gaming console, a gateway, an Internet of Things (IOT) device, etc. The computing device 101 include processors, controllers, such as the controller 112, and other components that execute software and/or control hardware to execute local programs or consume services provided by external service providers over a network. The computing device 101 may also, or instead, include a web interface running in a browser from which the electronic apparatus can access such web-based services. The computing device 101 may also include storage devices to store logic and data associated with the programs and services used by the computing device 101.

In embodiments, the controller 112 may be a central processing unit (CPU) located in a printed circuit board (PCB). In some embodiments, the controller 112 may be a programmable device that may execute a program. In embodiments, the controller 112 may be a microcontroller, a 16-bit processor, a 32-bit processor, a 64-bit processor, a single core processor, a multi-core processor, a digital signal processor, an embedded processor, or any other processor. In embodiments, an operating system may be operated on the controller 112, which may include the system driver for various protocols, the first protocol, or the second protocol. The operating system may include any system software that manages hardware or software resources for the computing device 101, and may provide services to applications. The operating system may be Windows®, Android OS, iOS, Linux, a real-time operating system (RTOS), an automotive infotainment operating system, among others. For example, the operating system may be a real-time operating system such as VxWorks, PikeOS, eCos, QNX, MontaVista Linux, RTLinux, Windows CE, or other operating system.

Figure 5:
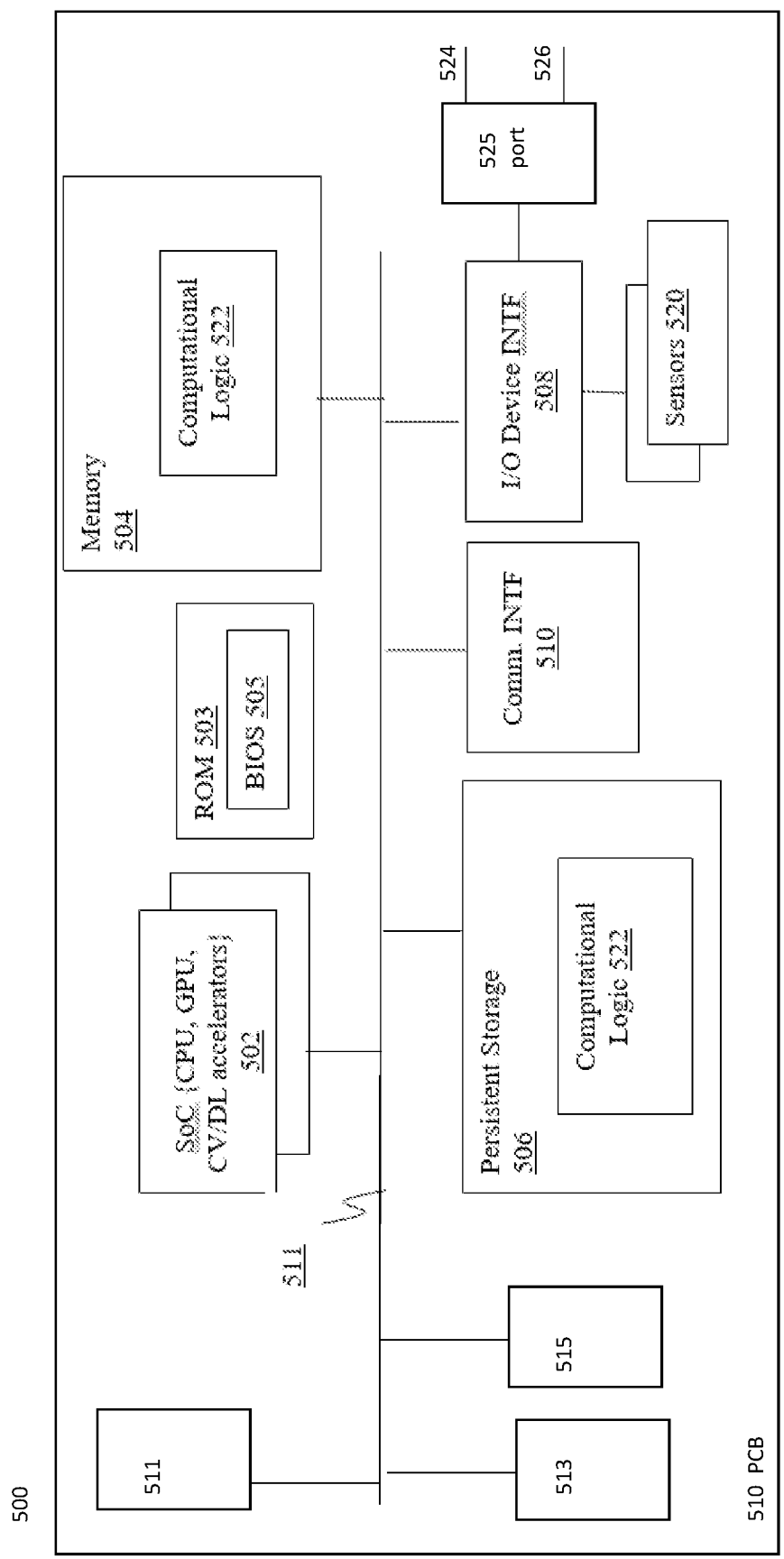
FIG. 5 illustrates a hardware component view of a computing platform suitable to practice the present disclosure, in accordance with various embodiments.
Figure 6:
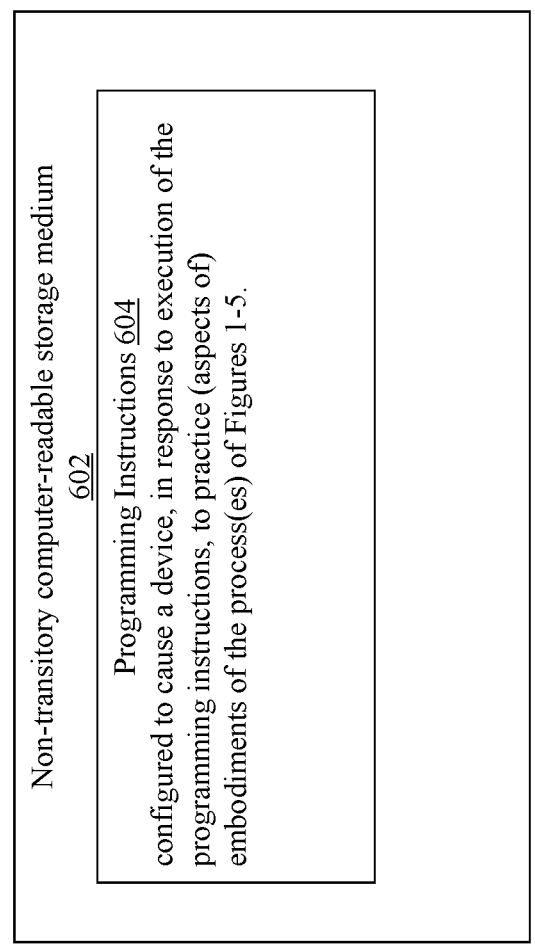
FIG. 6 illustrates a storage medium having instructions for practicing methods described with references to FIGS. 1-5, in accordance with various embodiments.

In embodiments, the computing device 101, the controller 112, first power controller 111, the second power controller 113, and the scheduler 115, may be implemented in various ways, e.g., by a computing platform 500 shown in FIG. 5, and may execute instructions stored in a computer-readable medium, e.g., the computer-readable medium 602 as shown in FIG. 6, or may be pre-configured with the logic (e.g., with appropriate bit streams, logic blocks, etc.).

Figure 2B:
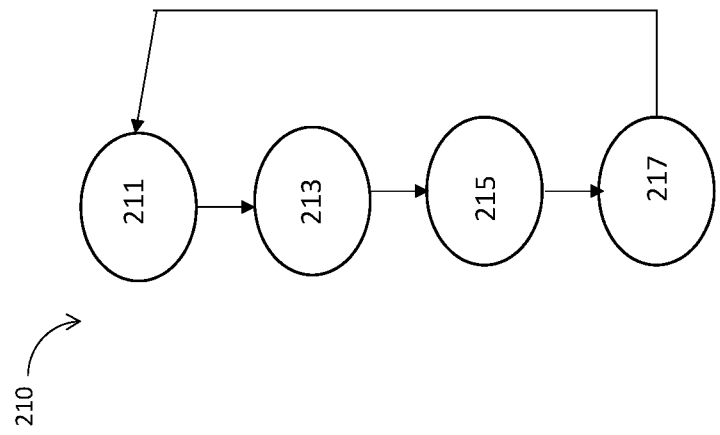
FIGS. 2(a)-2(b) illustrate example sets of power states for a lane of a communication port, in accordance with various embodiments.
Figure 2A:
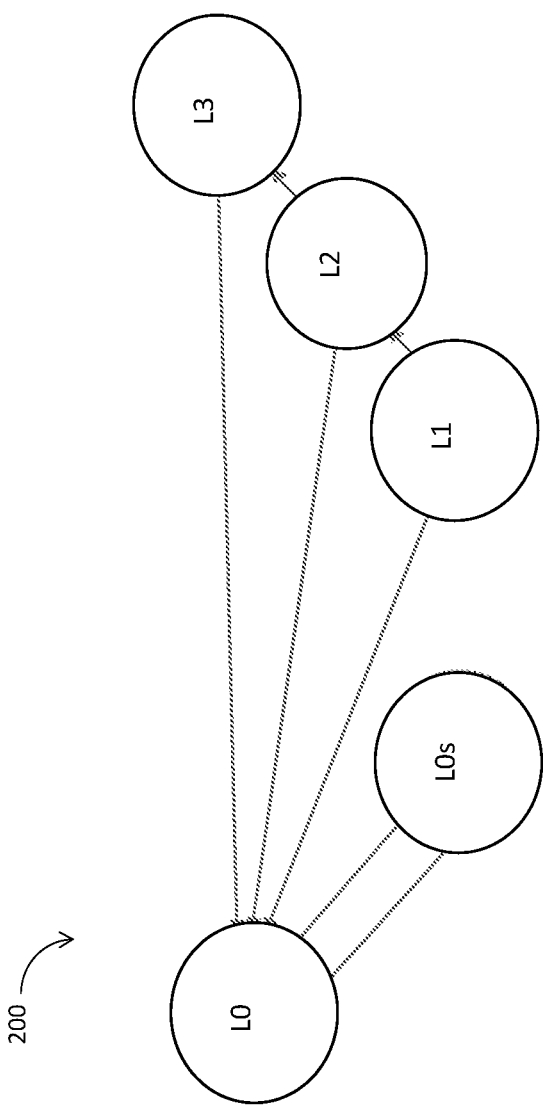

FIGS. 2(a)-2(b) illustrate example sets of power states for a lane of a communication port, in accordance with various embodiments. A set 200 of power states shown in FIG. 2(a), or a set 210 of power states shown in FIG. 2(b), may be the first set of power states for the first lane 122, or the second set of power states for the second lane 124. The first power controller 111 may control, at a first time instance, the first lane 122 to operate in a first power state 121 selected from the set 200 or the set 210. Similarly, the second power controller 113 may control, at a second time instance, the second lane 124 to operate in a second power state 123 selected from the set 200 or the set 210. The power states of the set 200 or the set 210 may form a finite state machine as shown.

In embodiments, the set 200 of power states includes the states L0, L0s, L1, L2, or L3, which may be similar to the power states of PCI compliant protocols. A fully operational lane may consume power about 96 mW in L0 state, 2 mW in L1 state, or 10 µW in L3 state. A lane may enter the state L0s from the state L0, enter the state L2 from the state L1, or enter the state L3 from the state L2. The set 200 of power states is merely an example. Other set of power states may include U0, U1, U2, or U3 states, similar to the power states of USB compliant protocols. Similarly, as shown in FIG. 2(b), the set 210 of power state may include states 211, 213, 215, and 217, with decreasing power consumptions. A lane may enter the state 213 from the state 211, enter the state 215 from the state 213, enter the state 217 from the state 215, or enter the state 211 from the state 217.

Even though the set 200 may include power states similar to the power states of PCI compliant protocols or USB compliant protocols, the first power controller 111 may control, at a first time instance, the first lane 122 to operate in the first power state 121. Similarly, the second power controller 113 may control, at a second time instance, the second lane 124 to operate in the second power state 123 different from the first power state 121. The operations of the first power controller 111 and the second power controller 113 are different from the power management techniques in power states of PCI compliant protocols or power states of USB compliant protocols. For example, in USB 3.2×2 operation, all lanes of a USB port are either in U0, or U1, U2, U3 simultaneously. Power management for USB ports would not allow to have one lane of the USB port in one power state while another lane of the USB port in a different power state at a same time instance. Similarly in PCIe multi-lane operation, all lanes of a PCIe port are either in L0, L0s, L1, L2, or L3 power state at a same time instance. Even though a PCIe port may have the lanes of the PCIe port in one power state at one direction, and another power state in the opposite direction at different time instance, but the PCIe port may not allow to have one lane of the PCIe port in one power state while another lane of the PCIe port in a different power state at a same time instance.

Figure 3A:
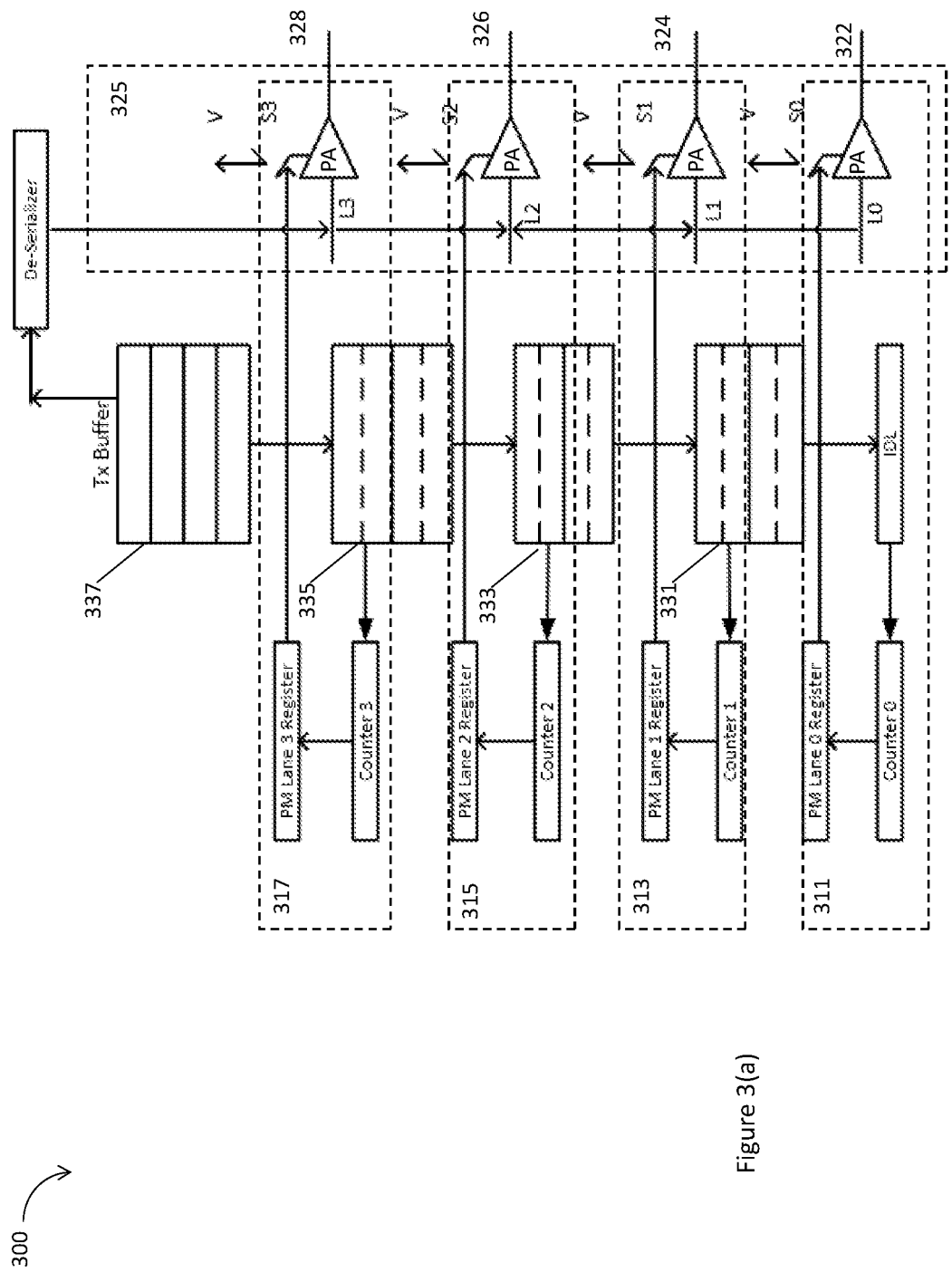
FIGS. 3(a)-3(b) illustrate an example computing device including multiple power controllers to control multiple lanes of a communication port, in accordance with various embodiments.
Figure 3B:
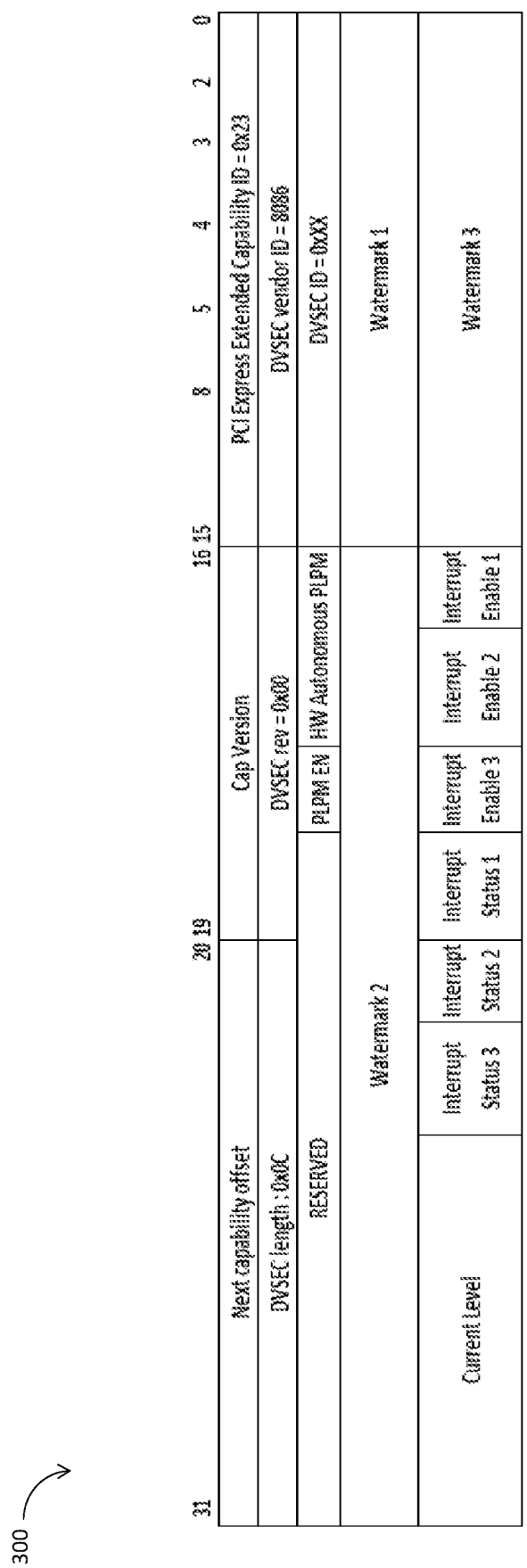

FIGS. 3(a)-3(b) illustrate an example computing device 300 including multiple power controllers to control multiple lanes of a communication port 325, in accordance with various embodiments. The computing device 300 may be an implementation of the computing device 101 including the first power controller 111, the second power controller 113, and the scheduler 115, as shown in FIG. 1. The computing device 300 may be used as a transmitter, while a similar computing device may be used as a receiver.

In embodiments, the communication port 325 includes a first lane 322, a second lane 324, a third lane 326, and a fourth lane 328. The computing device 300 includes a first power controller 311, a second power controller 313, a third power controller 315, and a fourth power controller 317. Each of the power controllers, e.g., the first power controller 311, the second power controller 313, the third power controller 315, and the fourth power controller 317, includes a counter, a register, and a power amplifier (PA). The counter and the register are used to control the operation of a switch coupled to the PA. The first power controller 311 controls, at a first time instance, the first lane 322 to operate in a first power state; the second power controller 313 controls, at a second time instance, the second lane 324 to operate in a second power state; the third power controller 315 controls, at a third time instance, the third lane 326 to operate in a third power state; and the fourth power controller 317 controls, at a fourth time instance, the fourth lane 328 to operate in a fourth power state. At least some of the first power state, the second power state, the third power state, and the fourth power state may be different from each other.

In embodiments, the computing device 300 further includes a buffer 337, a buffer 335, a buffer 333, and a buffer 331 to store packets of a traffic load to be transmitted by different lanes of the communication port 325. The buffer 337, the buffer 335, the buffer 333, and the buffer 331, may be implemented by hardware and/or software. The buffer 337 may be shared among the four lanes of the communication port 325. The buffer 337 may operate based on various threshold capacities, which may be referred as virtual watermarks, or simply watermarks. When available data stored in the buffer 337 to be transmitted through the communication port 325 falls below a first threshold capacity, the counter 3 for the fourth power controller 317 may start operation, e.g., ticking. The longer the counter 3 is ticking, the less power the PA within the fourth power controller 317 may consume. For example, if the counter 3 reaches 7 microseconds, the lane 328 may be in a power state L0s as illustrated in FIG. 2(a). The fourth power controller 317 may further turn off the fourth lane 328 when the data in the buffer 337 may fall further below some threshold capacity. Similarly, when available data stored in the buffer 337 to be transmitted through the communication port 325 falls below a second, a third, or a fourth threshold capacity, the counter 2 for the third power controller 315, the counter 1 for the second power controller 313, or the counter 0 for the first power controller 311, may start operation, e.g., ticking. Furthermore, the operations of the PA within the third power controller 315, the second power controller 313, or the first power controller 311 may be adjusted accordingly. Thus, the computing device 300 may be easily incorporated into ASPM to manage the communication port 325.

In embodiments, the first lane 322, the second lane 324, the third lane 326, and the fourth lane 328 may be in different power states at a same time instance, depending on the traffic load stored in the buffer 337. When a traffic load increases, the first lane 322, the second lane 324, the third lane 326, and the fourth lane 328 may switch to a power state to transmit more data of the traffic load. For example, if the communication port 325 is a part of a USB hub connected to a slow web link and the bandwidth could be supported by one out of four lanes, the remaining 3 lanes could be placed in a lower power state, which may save 3× (96 mW–10 μW)=~287 mW of power on a single physical layer connection. Similar power savings may be applicable to a PCIe communication port. When a user starts watching a high-resolution video, the communication port 325 may have more lanes switched to power states with higher power consumptions to support the video traffic load.

In embodiments, when the communication port 325 is a PCIe port, the various threshold capacities, or watermarks, of the buffer 337 may be implemented by PCIe designated vendor specific extended capability (DVSEC), as shown in FIG. 3(b), which may be an example of the scheduler 115. In detail, the HW autonomous PLPM register may be read only and applicable to root ports/downstream switch ports or end points implementing per lane power management (PLPM). The HW autonomous PLPM register can be used by system software to determine if there is support for hardware autonomous PLPM. If set, platform hardware may control turning on/off lanes autonomously. If not supported, system software (via a device driver) may have to control on/off of lanes via a platform specific interface. In addition, the PLPM Enable register may be used to turn on the endpoint to endpoint (E2E) PLPM. The PLPM Enable register may be turned on by device driver of the end point device connected to the communication port. Watermark 1, watermark 2, and watermark 3 registers may be used by system software to set the watermarks or threshold capacities for the buffer 337. For example, there may be 3 watermarks represent 25%, 50% and 75% of bandwidth. When the threshold capacity of the buffer 337 is below 75%, the fourth lane 328 may be in a lower power state. When the threshold capacity of the buffer 337 is below 50%, the fourth lane 328 and the third lane 326 may be in lower power states. When the threshold capacity of the buffer 337 is below 25%, the fourth lane 328, the third lane 326, and the second lane 324 may be in lower power states.

In addition, the Interrupt Enable 1, the Interrupt Enable 2, and Interrupt Enable 3 registers may be used by system software to enable interrupts when corresponding watermarks or threshold capacities are crossed (either goes above or below). The Interrupt status 1, Interrupt status 2, and Interrupt status 3 registers may indicates interrupt status of corresponding watermarks. The Current level register may allow for system software to probe the current buffer level to determine if lanes are to be turned ON or OFF. Together with Current level register, the Interrupt status registers determine if a current capacity of the buffer 337 is above or below a specific threshold capacity.

Figure 4:
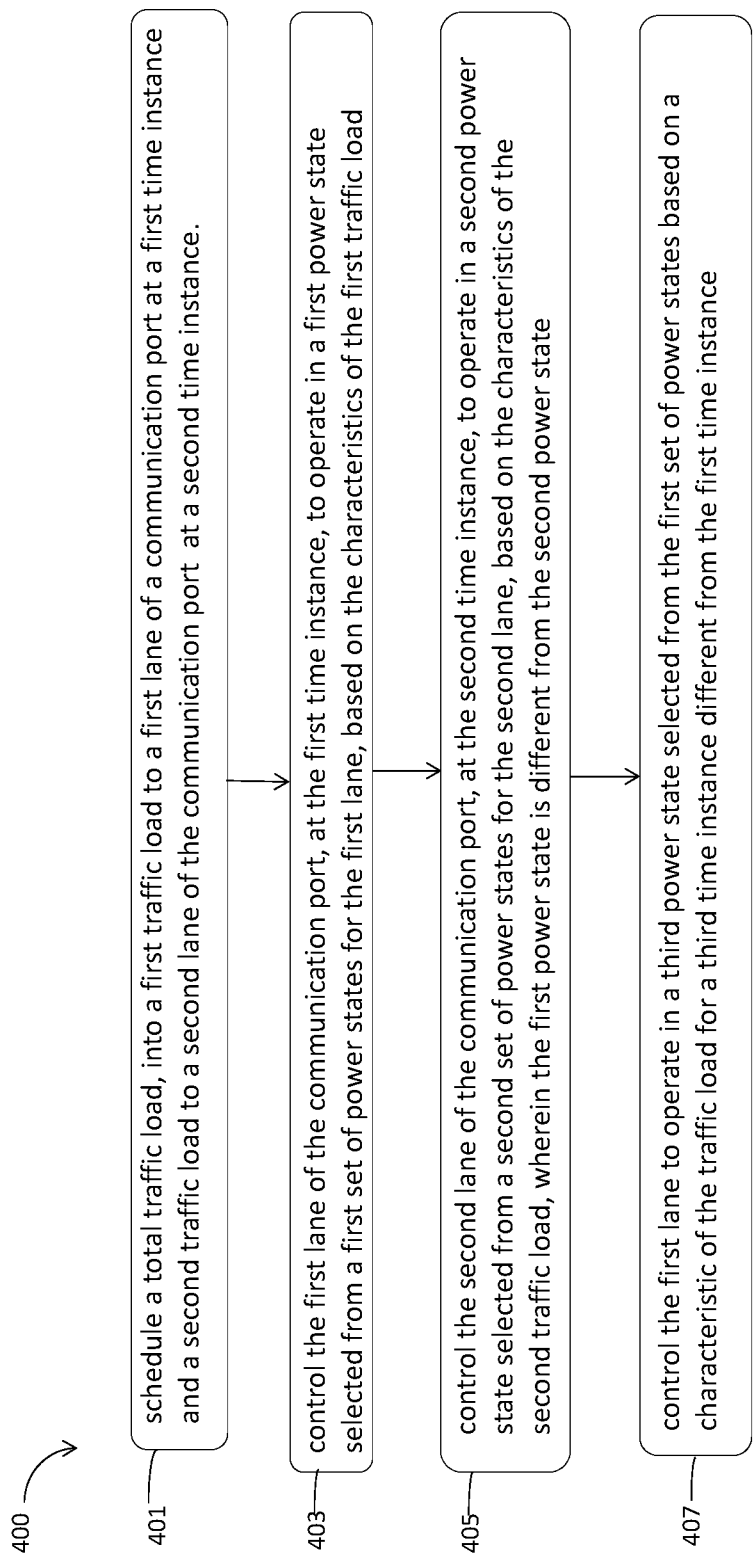
FIG. 4 illustrates an example process to be performed by a computing device including multiple power controllers to control multiple lanes of a communication port, in accordance with various embodiments.

FIG. 4 illustrates an example process 400 to be performed by a computing device including multiple power controllers to control multiple lanes of a communication port, in accordance with various embodiments. In embodiments, the process 400 may be a process performed by the computing device 101 as described in FIG. 1.

The process 400 may start at an interaction 401. During the interaction 401, operations may be performed to schedule a total traffic load, into a first traffic load to a first lane of a communication port at a first time instance and a second traffic load to a second lane of the communication port at a second time instance. For example, at the interaction 401, operations may be performed by the scheduler 115 to schedule the total traffic load 116, into the first traffic load 117 to the first lane 122 of the communication port 125 at a first time instance, and the second traffic load 118 to the second lane 124 of the communication port 125 at a second time instance.

During an interaction 403, operations may be performed to control the first lane of the communication port, at the first time instance, to operate in a first power state selected from a first set of power states for the first lane, based on the characteristics of the first traffic load. For example, at the interaction 403, the first power controller 111 may control the first lane 122 of the communication port 125, at the first time instance, to operate in the first power state 121 selected from the first set of power states for the first lane 122, based on the characteristics of the first traffic load 117.

During an interaction 405, operations may be performed to control the second lane of the communication port, at the second time instance, to operate in a second power state selected from a second set of power states for the second lane, based on the characteristics of the second traffic load, wherein the first power state is different from the second power state. For example, at the interaction 405, the second controller 113 may control the second lane 124 of the communication port 125, at the second time instance, to operate in the second power state 123 selected from a second set of power states for the second lane 124, based on the characteristics of the second traffic load 118, wherein the first power state 121 is different from the second power state 123.

During an interaction 407, operations may be performed to control the first lane to operate in a third power state selected from the first set of power states based on a characteristic of the traffic load for a third time instance different from the first time instance. For example, at the interaction 409, the first power controller 111 may control the first lane 122 to operate in a third power state selected from the first set of power states based on a characteristic of the traffic load 117 for a third time instance different from the first time instance.

FIG. 5 illustrates a hardware component view of a computing platform 500 suitable to practice the present disclosure, in accordance with various embodiments. As shown, the computing platform 500 may include one or more SoCs 502, ROM 503 and system memory 504. Each SoCs 502 may include one or more processor cores (CPUs), one or more graphics processor units (GPU), one or more accelerators, such as computer vision (CV) and/or deep learning (DL) accelerators. ROM 503 may include BIOS 505. CPUs, GPUs, and CV/DL accelerators may be any one of a number of these elements known in the art. Similarly, ROM 503 and basic input/output system services (BIOS) 505 may be any one of a number of ROM and BIOS known in the art, and system memory 504 may be any one of a number of volatile storage known in the art.

Additionally, computing platform 500 may include persistent storage devices 506. Example of persistent storage devices 506 may include, but are not limited to, flash drives, hard drives, compact disc read-only memory (CD-ROM) and so forth. Further, computing platform 500 may include input/output (I/O) device interface(s) 508 to interface with one or more I/O devices (such as display, keyboard, cursor control and so forth) and communication interfaces 510 (such as network interface cards, modems and so forth). In addition, I/O device interface 508 may include a communication port 525, a power controller 511, a power controller 513, and a scheduler 515 coupled to the communication port 525, to control a first lane 524 of the communication port 525, and to control a second lane 526 of the communication port 525. The communication port 525, the power controller 511, the power controller 513, and the scheduler 515 may be similar to the communication port 125, the power controller 111, the power controller 113, and the scheduler 115 as shown in FIG. 1. Similarly, in alternate embodiments, the communication port 525 may be a part of the communication interfaces 510. In some embodiments, the computing platform 500 may further include a number of sensors 520. Communication and I/O devices 508 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G) and so forth. The elements may be coupled to each other via system bus 511, which may represent one or more buses. In the case of multiple buses, they may be bridged by one or more bus bridges (not shown). Sensors 520 may include light detection and ranging (LiDAR) sensors, geo-positioning sensors, gyroscopes, accelerometers, temperature sensors, humidity sensors, and so forth.

Except of the communication port 525, the power controller 511, the power controller 513, and the scheduler 515, each of the other elements may perform its conventional functions known in the art. In particular, ROM 503 may include BIOS 505 having a boot loader. In embodiments, system memory 504 and mass storage devices 506 may be employed to store a working copy and a permanent copy of the programming instructions implementing the operations associated with an operating system, one or more applications, collectively referred to as computational logic 522. The computational logic 522 may be implemented by assembler instructions supported by processor core(s) of SoCs 502 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 6 illustrates a storage medium having instructions for practicing methods described with references to FIGS. 1-5, in accordance with various embodiments. As shown, non-transitory computer-readable storage medium 602 may include a number of programming instructions 604. Programming instructions 604 may be configured to enable a device, e.g., the power controller 511, the power controller 513, and the scheduler 515 of computing platform 500, in response to execution of the programming instructions, to implement (aspects of) operations associated with controlling, at a first time instance, the first lane 524 to operate in a first power state, and controlling, at a second time instance, the second lane 526 to operate in a second power state, as earlier described. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for communication, comprising: a communication port including a first lane and a second lane; a first power controller coupled to the communication port to control, at a first time instance, the first lane to operate in a first power state selected from a first set of power states for the first lane; and a second power controller coupled to the communication port to control, at a second time instance, the second lane to operate in a second power state selected from a second set of power states for the second lane, wherein the first power state is different from the second power state.

Example 2 may include the apparatus of example 1 and/or some other examples herein, wherein the first set of power states is a same set as the second set of power states.

Example 3 may include the apparatus of example 1 and/or some other examples herein, wherein the first time instance is a same time instance as the second time instance.

Example 4 may include the apparatus of example 1 and/or some other examples herein, wherein the first power controller controls the first lane to operate in the first power state selected from the first set of power states based on a characteristic of a traffic load at the first time instance for the communication port or for the first lane.

Example 5 may include the apparatus of example 4 and/or some other examples herein, wherein the characteristic of the traffic load at the first time instance is predominantly unidirectional at the first lane or under a full capacity supported by the communication port.

Example 6 may include the apparatus of example 4 and/or some other examples herein, wherein the first power controller controls the first lane to operate in a third power state selected from the first set of power states based on a characteristic of the traffic load for a third time instance different from the first time instance.

Example 7 may include the apparatus of example 1 and/or some other examples herein, wherein the communication port is a downstream facing port (DFP), a upstream facing port (UFP), or a dual-role-data (DRD) port.

Example 8 may include the apparatus of example 1 and/or some other examples herein, wherein the communication port is a part of an interface for a bi-directional communication protocol, or a half-duplex communication protocol.

Example 9 may include the apparatus of example 1 and/or some other examples herein, wherein the communication port is a part of a input/output (I/O) interface that is compliant with a protocol selected from universal serial bus (USB) 3.x, USB 2.0, USB 1.1, a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit (I$^2$C) protocol.

Example 10 may include the apparatus of example 1 and/or some other examples herein, wherein the first set of power states for the first lane includes a power level of 96 mW, a power level of 2 mW, or a power level of 10 μW.

Example 11 may include the apparatus of example 1 and/or some other examples herein, wherein the first set of power states for the first lane includes a power state selected from U0, U1, U2, or U3 states of USB protocol, or L0, L0s, L1, L2, or L3 states of PCI compliant protocols.

Example 12 may include the apparatus of example 1 and/or some other examples herein, further comprising: a scheduler coupled to the communication port, the first power controller, and the second power controller, wherein the scheduler is to schedule a total traffic load, into a first traffic load to the first lane at the first time instance and a second traffic load to the second lane at the second time instance, the first power controller to control the first lane to operate in the first power state at the first time instance based on a characteristic of the first traffic load, and the second power controller to control the second lane to operate in the second power state at the second time instance based on a characteristic of the second traffic load.

Example 13 may include the apparatus of example 12 and/or some other examples herein, wherein the scheduler is to schedule the first traffic load to be empty to switch off the first lane, and the first power state for the first lane is a power off state, when the total traffic load is below a threshold capacity.

Example 14 may include the apparatus of example 1 and/or some other examples herein, further comprising: a controller coupled to the communication port, wherein the first power controller and the second power controller are implemented by software executed on the controller.

Example 15 may include the apparatus of example 1 and/or some other examples herein, wherein the first power controller includes a first counter and a first power amplifier coupled to the first lane, and the second power controller includes a second counter and a second power amplifier coupled to the second lane.

Example 16 may include one or more non-transitory computer-readable media comprising instructions that cause a controller, in response to execution of the instructions by the controller, to: control a first lane of a communication port, at a first time instance, to operate in a first power state selected from a first set of power states for the first lane; and control a second lane of the communication port, at a second time instance, to operate in a second power state selected from a second set of power states for the second lane, wherein the first power state is different from the second power state.

Example 17 may include the one or more non-transitory computer-readable media of example 16 and/or some other examples herein, wherein the first lane is to operate in the first power state selected from the first set of power states based on a characteristic of a traffic load at the first time instance for the communication port or for the first lane, and the instructions further causes the controller, in response to execution of the instructions by the controller, to: control the first lane to operate in a third power state selected from the first set of power states based on a characteristic of the traffic load for a third time instance different from the first time instance.

Example 18 may include the one or more non-transitory computer-readable media of example 16 and/or some other examples herein, wherein the instructions further causes the controller, in response to execution of the instructions by the controller, to: schedule a total traffic load, into a first traffic load to the first lane at the first time instance and a second traffic load to the second lane at the second time instance, wherein the controller is to control the first lane to operate in the first power state at the first time instance based on a characteristic of the first traffic load, and the controller is to control the second lane to operate in the second power state at the second time instance based on a characteristic of the second traffic load.

Example 19 may include the one or more non-transitory computer-readable media of example 16 and/or some other examples herein, wherein the communication port is a part of a input/output (I/O) interface that is compliant with a protocol selected from universal serial bus (USB) 3.x, USB 2.0, USB 1.1, a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit (I$^2$C) protocol.

Example 20 may include the one or more non-transitory computer-readable media of example 16 and/or some other examples herein, wherein the first set of power states for the first lane includes a power level of 96 mW, a power level of 2 mW, or a power level of 10 μW, and the first set of power states for the first lane includes a power state selected from U0, U1, U2, or U3 states of USB protocol, or L0, L0s, L1, L2, or L3 states of PCI compliant protocols.

Example 21 may include an apparatus for computing, comprising: a printed circuit board (PCB) having a processor; a communication port including a first lane and a second lane disposed on the PCB, wherein the communication port is a part of a input/output (I/O) interface that is compliant with a peripheral component interconnect (PCI) protocol; and a controller disposed on the PCB and coupled to the first lane and the second lane, wherein the controller is to: control the first lane of the communication port, at a first time instance, to operate in a first power state selected from a first set of power states for the first lane; and control the second lane of the communication port, at a second time instance, to operate in a second power state selected from a second set of power states for the second lane, wherein the first power state is different from the second power state.

Example 22 may include the apparatus of example 21 and/or some other examples herein, further comprising: a scheduler coupled to the first lane, the second lane, and the controller, wherein the scheduler is to schedule a total traffic load at the time instance, into a first traffic load to the first lane and a second traffic load to the second lane, the controller is to control the first lane to operate in the first power state at the time instance based on a characteristic of the first traffic load, and the controller is to control the second lane to operate in the second power state at the time instance based on a characteristic of the second traffic load.

Example 23 may include the apparatus of example 21 and/or some other examples herein, wherein the first set of power states is a same set as the second set of power states, and the first time instance is a same time instance as the second time instance.

Example 24 may include the apparatus of example 21 and/or some other examples herein, wherein the first lane is to operate in the first power state selected from the first set of power states based on a first characteristic of a traffic load at the first time instance for the communication port or for the first lane, and the controller controls the first lane to operate in a third power state selected from the first set of power states based on a third characteristic of the traffic load for a third time instance different from the first time instance.

Example 25 may include the apparatus of example 24 and/or some other examples herein, wherein the first characteristic of the traffic load at the first time instance is predominantly unidirectional at the first lane or under a full capacity supported by the communication port.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for communication, comprising:
   a communication port including a first lane and a second lane;
   a buffer to store data to be transmitted via the first or second lane;
   a first power controller coupled to a processor, the buffer, and the communication port, wherein the first power controller includes a first counter, a first power amplifier (PA) coupled with the first counter, provided to control, at a first time instance, the first lane to operate in a first power state selected from a first set of power states for the first lane, wherein when the data stored in the buffer falls below a first threshold, the first counter begins a first count, to control the first power amplifier to operate in the first power state; and
   a second power controller coupled to the processor, buffer, and communication port, wherein the second power controller includes a second counter, and a second PA coupled with the second counter, provided to control, at a second time instance, the second lane to operate in a second power state selected from a second set of power states for the second lane, wherein when the data stored in the buffer falls below a second threshold, the second counter begins a second count, to control the second power amplifier to operate in the second power state, wherein the first power state is different from the second power state, wherein when the data stored in the buffer falls below a third threshold, the first power controller operates the first PA to turn off the first lane to preclude data transmission through the first lane, wherein when the data stored in the buffer falls below a fourth threshold, the second power controller operates the second PA to turn off the second lane to preclude data transmission through the second lane.

2. The apparatus of claim 1, wherein the first set of power states is a same set as the second set of power states.

3. The apparatus of claim 1, wherein the first time instance is a same time instance as the second time instance.

4. The apparatus of claim 1, wherein the first power controller controls the first lane to operate in the first power state selected from the first set of power states based on a characteristic of a traffic load at the first time instance for the communication port or for the first lane.

5. The apparatus of claim 4, wherein the first power controller controls the first lane to operate in a third power state selected from the first set of power states based on a characteristic of the traffic load for a third time instance different from the first time instance.

6. The apparatus of claim 1, wherein the communication port is a downstream facing port (DFP), a upstream facing port (UFP), or a dual-role-data (DRD) port.

7. The apparatus of claim 1, wherein the communication port is a part of an interface for a bi-directional communication protocol, or a half-duplex communication protocol.

8. The apparatus of claim 1, wherein the communication port is a part of a input/output (I/O) interface that is compliant with a protocol selected from universal serial bus (USB) 3.x, USB 2.0, USB 1.1, a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit ($I^2C$) protocol.

9. The apparatus of claim 1, wherein the first set of power states for the first lane includes a power level of 96 mW, a power level of 2 mW, or a power level of 10 μW.

10. The apparatus of claim 1, wherein the first set of power states for the first lane includes a power state selected from U0, U1, U2, or U3 states of USB protocol, or L0, L0s, L1, L2, or L3 states of PCI compliant protocols.

11. The apparatus of claim 1, further comprising:
    a scheduler coupled to the communication port, the first power controller, and the second power controller, wherein the scheduler is to schedule a total traffic load, into a first traffic load to the first lane at the first time instance and a second traffic load to the second lane at the second time instance, the first power controller to control the first lane to operate in the first power state at the first time instance based on a characteristic of the first traffic load, and the second power controller to control the second lane to operate in the second power state at the second time instance based on a characteristic of the second traffic load.

12. One or more non-transitory computer-readable media comprising instructions stored thereon and executable on a computing device, wherein the computing device comprises: a processor, a communication port including a first lane and a second lane; a buffer to store data to be transmitted via the first or second lane; a first power controller coupled to the processor, buffer, and communication port, wherein the first power controller includes a first counter, and a first power amplifier (PA) coupled with the first counter; and a second power controller coupled to the processor, buffer, and communication port, wherein the second power controller includes a second counter, and a second PA coupled with the second counter,
    wherein the instructions, in response to execution of the instructions by the computing device, cause the computing device to:
    control a first lane of a communication port of the computing device, at a first time instance, to operate in a first power state selected from a first set of power states for the first lane, wherein the instructions, when the data stored in the buffer falls below a first threshold, cause the first counter to begin a first count, to control the first power amplifier to operate in the first power state; and control a second lane of the communication port, at a second time instance, to operate in a second power state selected from a second set of power states for the second lane, wherein the instructions, when the data stored in the buffer falls below a second threshold, cause the second counter to begin a second count, to control the second power amplifier to operate in the second power state, wherein the first power state is different from the second power state, wherein when the data stored in the buffer falls below a third threshold, the instructions cause the first power controller to operate the first PA to turn off the first lane to preclude data transmission through the first lane, wherein when the data stored in the buffer falls below a fourth threshold, the instructions cause the second power controller to operate the second PA to turn off the second lane to preclude data transmission through the second lane.

13. The one or more non-transitory computer-readable media of claim 12, wherein the first lane is to operate in the first power state selected from the first set of power states based on a characteristic of a traffic load at the first time instance for the communication port or for the first lane, and the instructions further causes the computing device, in response to execution of the instructions by the computing device, to:

control the first lane to operate in a third power state selected from the first set of power states based on a characteristic of the traffic load for a third time instance different from the first time instance.

14. The one or more non-transitory computer-readable media of claim 12, wherein the instructions further causes the computing device, in response to execution of the instructions by the computing device, to:

schedule a total traffic load, into a first traffic load to the first lane at the first time instance and a second traffic load to the second lane at the second time instance, wherein the controller is to control the first lane to operate in the first power state at the first time instance based on a characteristic of the first traffic load, and the controller is to control the second lane to operate in the second power state at the second time instance based on a characteristic of the second traffic load.

15. The one or more non-transitory computer-readable media of claim 12, wherein the communication port is a part of a input/output (I/O) interface that is compliant with a protocol selected from universal serial bus (USB) 3.x, USB 2.0, USB 1.1, a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit ($I^2C$) protocol.

16. The one or more non-transitory computer-readable media of claim 12, wherein the first set of power states for the first lane includes a power level of 96 mW, a power level of 2 mW, or a power level of 10 μW, and the first set of power states for the first lane includes a power state selected from U0, U1, U2, or U3 states of USB protocol, or L0, L0s, L1, L2, or L3 states of PCI compliant protocols.

* * * * *